United States Patent
Lundvall et al.

(10) Patent No.: US 11,113,037 B2
(45) Date of Patent: Sep. 7, 2021

(54) SOFTWARE PERFORMANCE MODIFICATION

(71) Applicant: INTERNATIONAL BUSINESS MACHINES CORPORATION, Armonk, NY (US)

(72) Inventors: Shawn D Lundvall, Moseley, VA (US); Kathleen M. Walsh, Laytonville, MD (US); John P Burg, Bloomfield Hills, MI (US); Bradley D. Snyder, Coppell, TX (US); Valerie Spencer, Germantown, VA (US); Joel Matthew Moss, Peasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 16/677,778

(22) Filed: Nov. 8, 2019

(65) Prior Publication Data

US 2021/0141615 A1   May 13, 2021

(51) Int. Cl.
| | |
|---|---|
| *G06F 9/44* | (2018.01) |
| *G06F 8/34* | (2018.01) |
| *G06N 20/00* | (2019.01) |
| *G06F 8/77* | (2018.01) |
| *G06F 8/70* | (2018.01) |
| *G06F 8/10* | (2018.01) |
| *G06K 9/62* | (2006.01) |

(52) U.S. Cl.
CPC .................. *G06F 8/34* (2013.01); *G06F 8/70* (2013.01); *G06F 8/77* (2013.01); *G06N 20/00* (2019.01); *G06F 8/10* (2013.01); *G06K 9/6267* (2013.01)

(58) Field of Classification Search
CPC ..... G06F 8/34; G06F 8/70; G06F 8/77; G06F 8/10; G06N 20/00; G06K 9/6267
See application file for complete search history.

(56) References Cited

U.S. PATENT DOCUMENTS

| | | | |
|---|---|---|---|
| 6,952,689 B2 | 10/2005 | Brandon | |
| 2007/0109598 A1* | 5/2007 | Clark | G06F 16/54 358/1.16 |
| 2009/0052736 A1* | 2/2009 | Kacker | G06T 7/97 382/100 |
| 2011/0072253 A1 | 3/2011 | Iqbal | |
| 2011/0145028 A1 | 6/2011 | Khilnani | |
| 2013/0266214 A1* | 10/2013 | Lillywhite | G06K 9/6217 382/156 |
| 2015/0170001 A1* | 6/2015 | Rabinovich | G06K 9/6267 382/110 |
| 2016/0004936 A1* | 1/2016 | Sawney | G06K 9/6253 382/159 |
| 2016/0026960 A1 | 1/2016 | Carnahan | |

* cited by examiner

*Primary Examiner* — Hang Pan
(74) *Attorney, Agent, or Firm* — Schmeiser, Olsen & Watts; Aaron Pontikos

(57) ABSTRACT

A method and system for modifying software performance management and capacity planning is provided. The method includes presenting graphical images associated with tailoring hardware and software systems for specialized functionality. A selection and associated order for a group of images is received from a user. The specified group of images is stored with respect to the order and specialized software code associated with the group of images is generated and executed. In response, the candidate hardware and software system is tailored for specialized functionality with respect to capturing expert knowledge and best practices.

20 Claims, 12 Drawing Sheets

SOFTWARE PERFORMANCE MODIFICATION

BACKGROUND

The present invention relates generally to a method for modifying software performance management and capacity planning and in particular to a method and associated system for improving software technology associated with selecting graphical images, generating associated software code, and tailoring a hardware and software system for specialized functionality with respect to capturing expert knowledge and best practices.

SUMMARY

A first aspect of the invention provides a software performance management and capacity planning generation and modification method comprising: presenting, by a processor of an electronic device via a graphical user interface (GUI), a plurality of graphical images associated with tailoring hardware and software systems for specialized functionality; receiving, by the processor from an authoritative user, a selection for a specified group of images of the plurality of graphical images; receiving, by the processor from the authoritative user, an order of the specified group of images; storing, by the processor within a specified portion of an external specialized memory device, the specified group of images with respect to the order; generating, by the processor, specialized software code comprising the specified group of images or previously stored images retrieved from the specified portion of the external specialized memory device; executing, by the processor, the specialized software code; and tailoring, by the processor in response to the executing, the candidate hardware and software system for the specialized functionality with respect to capturing expert knowledge and best practices.

A second aspect of the invention provides a computer program product, comprising a computer readable hardware storage device storing a computer readable program code, the computer readable program code comprising an algorithm that when executed by a processor of an electronic device implements a software performance management and capacity planning generation and modification method, the method comprising: presenting, by the processor via a graphical user interface (GUI), a plurality of graphical images associated with tailoring hardware and software systems for specialized functionality; receiving, by the processor from an authoritative user, a selection for a specified group of images of the plurality of graphical images; receiving, by the processor from the authoritative user, an order of the specified group of images; storing, by the processor within a specified portion of an external specialized memory device, the specified group of images with respect to the order; generating, by the processor, specialized software code comprising the specified group of images or previously stored images retrieved from the specified portion of the external specialized memory device; executing, by the processor, the specialized software code; and tailoring, by the processor in response to the executing, the candidate hardware and software system for the specialized functionality with respect to capturing expert knowledge and best practices.

A third aspect of the invention provides an electronic device comprising a processor coupled to a computer-readable memory unit, the memory unit comprising instructions that when executed by the processor implements a software performance management and capacity planning generation and modification method comprising: presenting, by the processor via a graphical user interface (GUI), a plurality of graphical images associated with tailoring hardware and software systems for specialized functionality; receiving, by the processor from an authoritative user, a selection for a specified group of images of the plurality of graphical images; receiving, by the processor from the authoritative user, an order of the specified group of images; storing, by the processor within a specified portion of an external specialized memory device, the specified group of images with respect to the order; generating, by the processor, specialized software code comprising the specified group of images or previously stored images retrieved from the specified portion of the external specialized memory device; executing, by the processor, the specialized software code; and tailoring, by the processor in response to the executing, the candidate hardware and software system for the specialized functionality with respect to capturing expert knowledge and best practices.

The present invention advantageously provides a simple method and associated system capable of accurately modifying software performance management and capacity planning.

DETAILED DESCRIPTION

Figure 1:
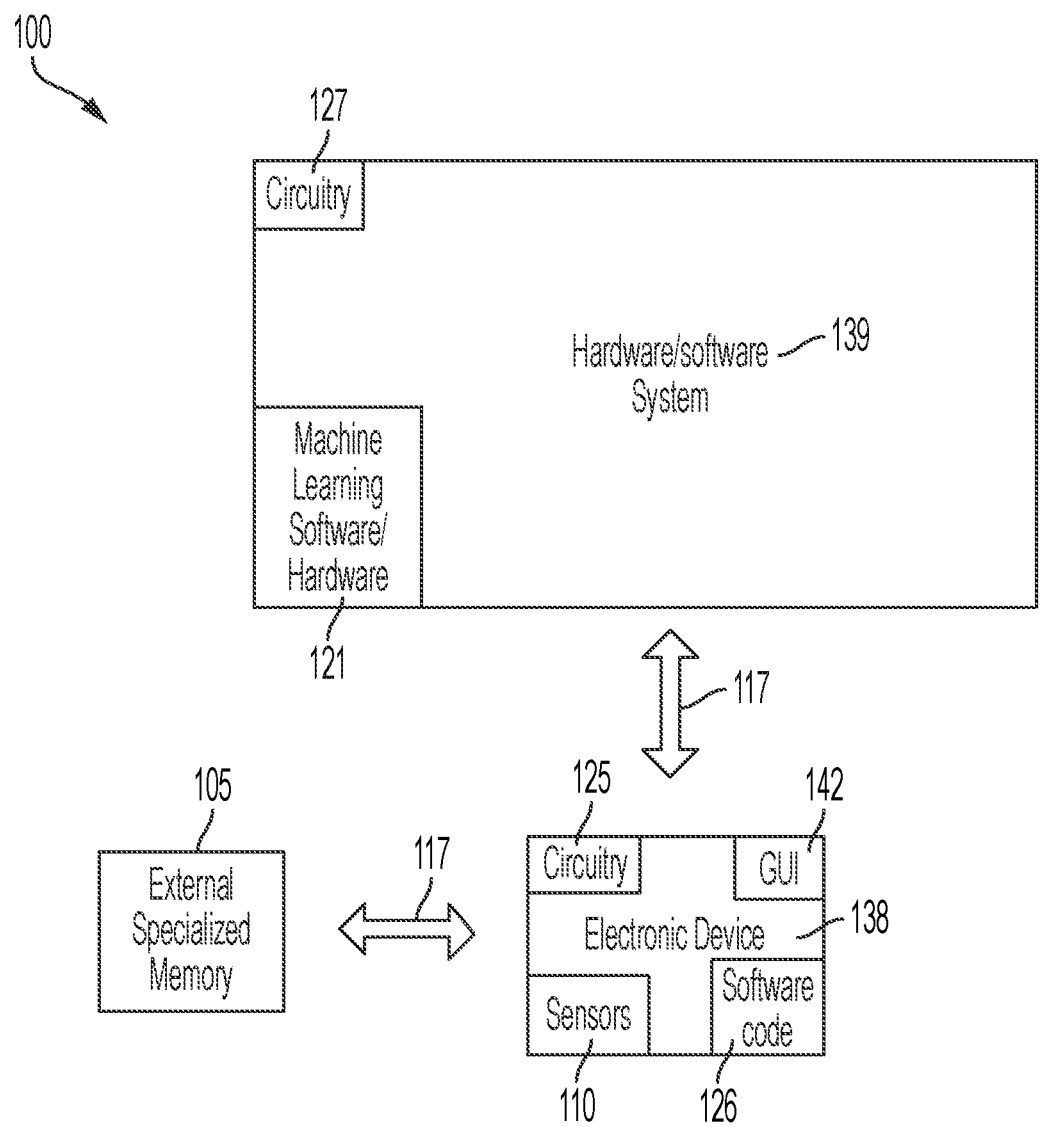
FIG. 1 illustrates a system for improving software technology associated with selecting graphical images, generating associated software code, and tailoring a hardware and software system for specialized functionality with respect to capturing expert knowledge and best practices, in accordance with embodiments of the present invention.

FIG. 1 illustrates a system 100 for improving software technology associated with selecting graphical images, generating associated software code, and tailoring a hardware and software system 138 for specialized functionality with respect to capturing expert knowledge and best practices, in accordance with embodiments of the present invention. A standard practitioner and performance modification system comprise limitations with respect to locating sufficient subject matter expertise for capacity planning or performance analysis associated with a critical server infrastructure. A very deep level of technical skill is required to: sift through a vast amount of data sources, determine which sets of data are applicable, interpret the data, and create a report and system that translates the data indications in an easy to understand format. Likewise, insufficient subject matter expert skill for complex capacity planning problems combined with an increasing speed of IT delivery required for enterprises to successfully compete in the Web based marketplace further limits organizations with respect to competition. Additionally, entities comprising limited resources may be unable to quickly and accurately project server capacity and diagnose hardware/software performance issues thereby leading to lost opportunities. Furthermore, there is a need for less experienced practitioners to be able to dynamically create detailed system analyses without direct engagement from subject matter experts. Likewise, inexperienced practitioners may be required to promote confidence that all functionality will follow industry best practices. Therefore, system 100 comprises an improved system for allowing for the capture and promulgation of subject matter experts based intellectual capital to enable inexperienced practitioners in the field to analyze and modify performance systems and associated data. Likewise, the ability for an expert to quickly share performance analysis methodologies for any emerging technologies with a wider technical community will increase the ability for enabling system enhancements across hardware and software systems.

System 100 comprises an improved system and process for enabling a subject matter expert (SME) via execution of code/hardware with respect to capacity planning and performance management to create, group, order, and name a set of graphs assigned as a favorite set (e.g., specialized software). A favorite set of graphs is defined herein as a preferred set of graphs customized to fit the need of a specified environment or set of actions. A favorite set may be selected by an SME via software execution. One or more favorite sets are stored within external specialized memory structure 105 and are kept up to date by the SME via regular updates.

A favorite set may be accessed by any practitioner (via system 100) to create a complete a customized report. System, 100 enables the ability to manipulate and share a favorite set between practitioners and experts. Favorite sets are flexible and may be tailored by the SME to create a data structure from a general set of system reports applicable to any computing environment with respect to a detailed analysis for special case scenarios.

A favorite set may be imported to an apparatus (e.g., electronic device 138) for generating a complete capacity planning document comprising graphs and customized text based on a data source. Additionally, practitioners may retrieve an existing favorite set, customize it to fit the needs of a particular environment, and save the unique favorite set for later use.

System 100 enables less experienced practitioners to dynamically create a detailed system analysis (e.g., with respect to hardware and software operational attributes) that was not previously possible without direct engagement from an SME. Additionally, system 100 enable SMEs to view all analysis graphs from a single storage location thereby allowing the SMEs to select and place relevant graphs within a proper order for review.

System 100 enables the following process for enabling an intelligent capacity planning and performance management system by creating, grouping, and ordering a set of graphs retrieved from expert users thereby reducing a time and skill required for analyzing performance data. System 100 enables the following functionality associated with intelligent capacity planning and performance management:

1. Monitoring and storing expert user data requests and data utilization (e.g., graphs, transformations, data analyses, etc.).
2. Applying relevant actions based on the monitored user data to generate insights with respect to new data and code in response to receiving input of new data.
3. Generating data reports (analytics) corresponding to the new data based on generated insights. Machine learning code utilizes data subsets generated by the expert user (SME) via a graphical user interface for application to additional data sets for generating a report.

System 100 of FIG. 1 includes a hardware/software system 139, an electronic device 138 (i.e., a specialized hardware device), and an external specialized memory structure 105 interconnected through a network 117. Hardware/software system 139 includes specialized circuitry 127 (that may include specialized software) and machine learning software code/hardware structure 121 (i.e., including machine learning software code). Electronic device 138 may include, inter alia, a smart phone, a tablet computer, a computer, etc. Electronic device 138 may be Bluetooth enabled to provide connectivity to each other and any type of system. Electronic device 138 includes specialized circuitry 125 (that may include specialized software), sensors 110, software code 126, and a GUI 142. Sensors 110 may include any type of internal or external sensor (or biometric sensor) including, inter alia, ultrasonic three-dimensional sensor modules, a heart rate monitor, a blood pressure monitor, a temperature sensor, a pulse rate monitor, an ultrasonic sensor, an optical sensor, a video retrieval device, an audio retrieval device, humidity sensors, voltage sensors, etc. Hardware/software system 139 and electronic device 138 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, hardware/software system 139 and electronic device 138 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving software technology associated with selecting graphical images, generating associated software code, and tailoring hardware and software system 138 for said specialized functionality with respect to capturing expert knowledge and best practices. Network 117 may include any type of network including, inter alia, a local area network, (LAN), a wide area network (WAN), the Internet, a wireless network, etc. Alternatively, network 117 may include an application programming interface (API).

Electronic device 138 comprises a structure comprising multiple graphical images and reports for generating a subset of the graphical images and reports tailored for a specific purpose. Electronic device 138 may be updated to add a new (hardware/software) function referred to as manage favorites. The manage favorites function allows for a subset of the graphic images to be generated. The subset comprises a favorite set and electronic device 138 generates a set of standard favorite sets for typical performance management and capacity planning activities.

A favorite set comprises a subset of the available graphical images within electronic device 138. The favorite set is required to complete a specific study or software/hardware related task. The favorite set comprises a named list of graphical images arranged in a specific order. Multiple named lists targeting different studies or tasks may be available for analysis but only one favorite set may be loaded and active at a specified time. The favorite set may be used across multiple different studies with different sets of performance data.

GUI 142 enables a practitioner to view all available graphical images and reports within electronic device 138 and select images for inclusion within the favorite set. The practitioner is responsible for selecting and ordering graphical images for the favorite set. Electronic device 138 comprises a multi-select option for selecting one or more graphical images.

All available graphical images within an internal software tool (i.e., a master list) are listed within a single section of a new software function. The graphical images selected for inclusion within the favorite set are configured to appear within another section of GUI 142. As the graphical images are selected for inclusion within the favorite set, they are grayed out within a master list of graphical images. Any new graphical images selected for inclusion within the favorite set are appended to the list of those already included.

GUI 142 comprises a set of movement buttons for rearranging one or more groups of graphs with in the favorite set. Additionally, GUI 142 comprises action buttons for enabling easy single click movements of one or more graphical images within the favorite set. An order of a set of graphical images is configured to control generation of the graphical images within a document.

Additionally, as new graphic images are added to electronic device 138, they are automatically included in a master list of available graphical images. Favorite sets may be updated at any time with respect to newly created graphical images.

Favorite sets may be saved externally within an external specialized memory structure 105 thereby providing the ability for practitioners to retain and share their favorite sets for report generation. A practitioner may use a favorite set function to quickly create focused individual studies including only graphical images pertaining to a topic. Favorite sets may be reused multiple times thereby improving productivity.

Standard favorite sets are created by leading performance and capacity planning SMEs. Standard favorite sets are constructed for common performance management and capacity planning tasks such as, inter alia, parallel sysplex review functionality, central storage usage functionality, workload manager review functionality, etc. Common performance management and capacity planning tasks enable a reduction of a skill level and time required by a practitioner to complete standard studies. A standard study may not be modified but may be used as a base for a favorite set which may be updated by the practitioner and saved externally as another named favorite set.

A function within electronic device 138 allows for the creation, importation, and saving of multiple favorite sets. When importing a favorite set, a practitioner is required to supply the descriptive name of a favorite set previously created by electronic device 138.

Once a Favorite Set has been selected or created, a generate function may be used to create a document. The generate function takes the favorite set and creates the graphical images and reports and creates a report.

Figure 2:
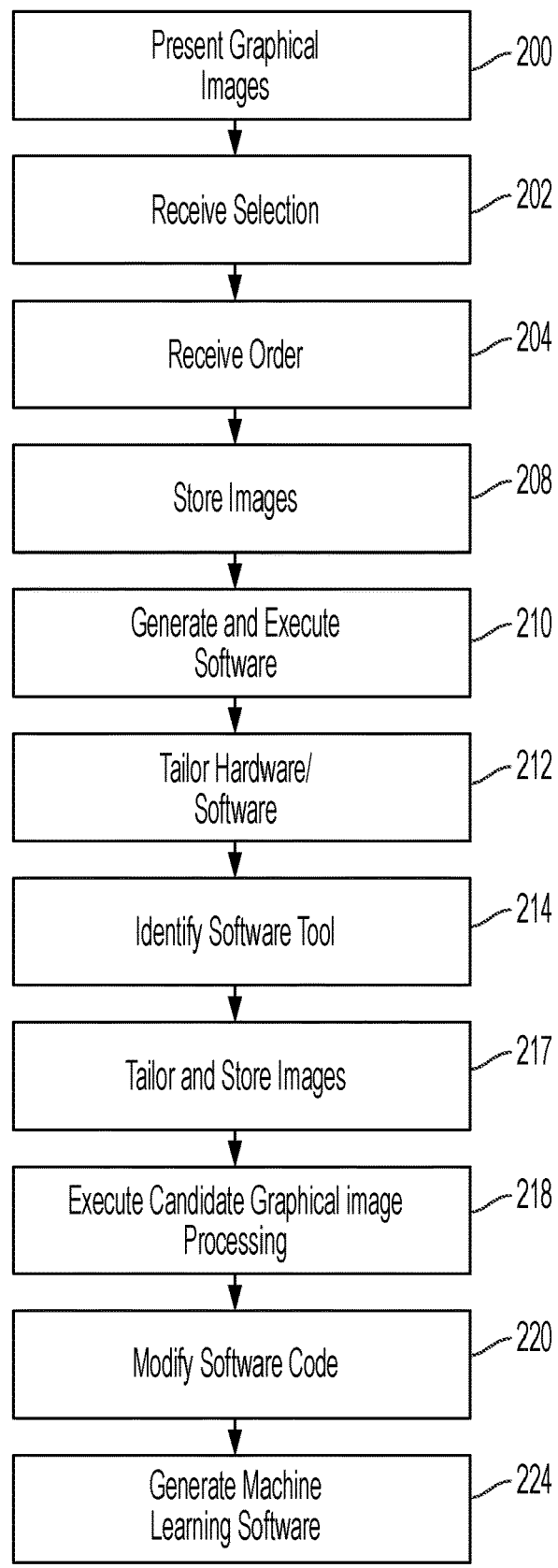
FIG. 2 illustrates an algorithm detailing a process flow enabled by the system of FIG. 1 for improving software technology associated with selecting graphical images, generating associated software code, and tailoring a hardware and software system for specialized functionality with respect to capturing expert knowledge and best practices, in accordance with embodiments of the present invention.

FIG. 2 illustrates an algorithm detailing a process flow enabled by system 100 of FIG. 1 for improving software technology associated with selecting graphical images, generating associated software code, and tailoring a hardware and software system 138 for specialized functionality with respect to capturing expert knowledge and best practices, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by hardware/software system 139 and/or electronic device 138 of FIG. 1. In step 200, graphical images associated with tailoring hardware and software systems are presented (via a graphical user interface (GUI) and a specialized software tool) for specialized functionality. In step 202, a selection for a specified group of images of the graphical images is received from an authoritative user. An authoritative user is defined herein as a practitioner or SME associated with a technical field related to the graphical images. In step 204, an order of the specified group of images is received from the authoritative user. In step 208, the specified group of images is stored (with respect to the order) within a specified portion of an external specialized memory device. In step 210, specialized software code is generated. The specialized software code comprises the specified group of images or previously stored images retrieved from the specified portion of the external specialized memory device. The specialized software code is executed. In step 212, the candidate hardware and software system is tailored for said specialized functionality with respect to capturing expert knowledge and best practices. In step 214, a software tool associated with the graphical images is identified. In step 217, a tailoring and storing process is executed in accordance with the following configurations:

A first configuration comprises tailoring additional graphical images (from the available set of graphical images) for modifying the specified group of images for an enhanced specialized functionality. The additional graphical images are stored (within a specified portion of an external specialized memory device) with respect to the order for an enhanced specialized functionality.

A second configuration comprises tailoring removal of graphical images for modifying the specified group of images for enhanced specialized functionality. The additional graphical images are stored (within a specified portion of an external specialized memory device) with respect to the order for an enhanced specialized functionality.

A third configuration comprises tailoring an order of the newly specified group of images for an enhanced specialized functionality. The newly specified group of images are stored (within a specified portion of an external specialized memory device) with respect to the order for an enhanced specialized functionality.

In step 218, a candidate graphical imaging process is executed by:
1. Receiving a generated set of candidate graphical images.
2. Presenting (via a graphical user interface (GUI)) the generated set of candidate graphical images.
3. Previewing a specified graphical image from the generated set of candidate graphical images.
4. Tailoring an order of the generated set of candidate graphical images.
5. Tailoring removal of a graphical image from the generated set of candidate graphical images.
6. Generating the generated set of candidate graphical images in the order with additional document elements comprising a glossary or table of contents.
7. Storing the generated set of candidate graphical images within the specified portion of the external specialized memory device.
8. Identifying the generated set of candidate graphical images and a set of summary items. The summary items are ranked via a suggested classification system or via free form classification functionality.
9. Presenting the generated set of candidate graphical images.
10. Generating an executive digital summary describing a modification request consisting of the set of summary items.
11. Generating editing functions via free form functionality associated with the modification request. The editing functions may include, inter alia, adding functions, deleting functions, reordering functions, etc.
12. Generating ranking functions associated with the modification request.
13. Combining the specified group of graphical images with the executive digital summary.
14. Storing the combined set of candidate graphical images and the set of summary items.

In step 220, modified software code is generated based on applying actions to the specialized software code. In step 224, machine learning software code is generated for executing future processes associated with executing a software capacity planning and performance management generation and modification method. The machine learning software code is stored within a modified portion of a memory structure of the electronic device.

FIGS. 3A-3H illustrate the following implementation example enabled by system 100 of FIG. 1 for encapsulating capacity planning and performance management expertise for improving system productivity by reducing time and technical skill requirements, in accordance with embodiments of the present invention. The process is initiated in FIG. 3A when a centralized list of all available graphical images 300 within a software tool is presented such that practitioner may select desired graphic images for a specific study.

Figure 3A:
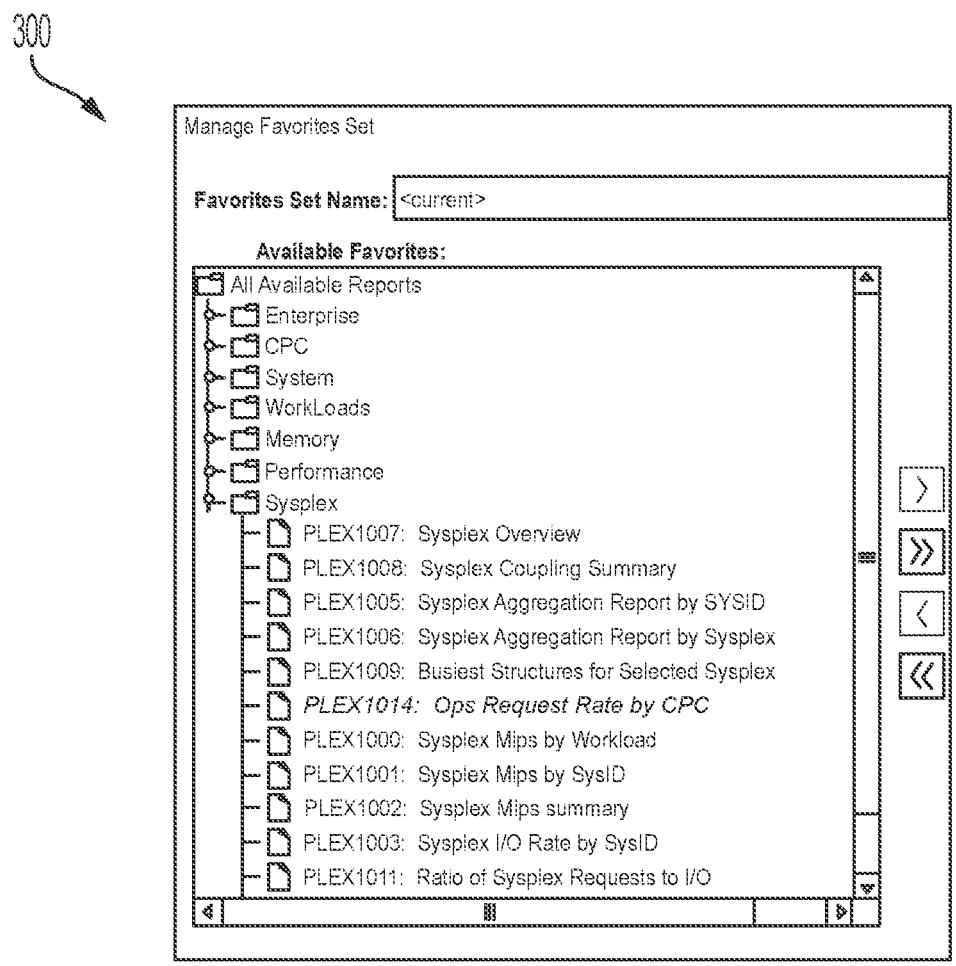
FIGS. 3A-3H illustrate an implementation example enabled by the system of FIG. 1 for encapsulating capacity planning and performance management expertise for improving system productivity by reducing time and technical skill requirements, in accordance with embodiments of the present invention
Figure 3B:
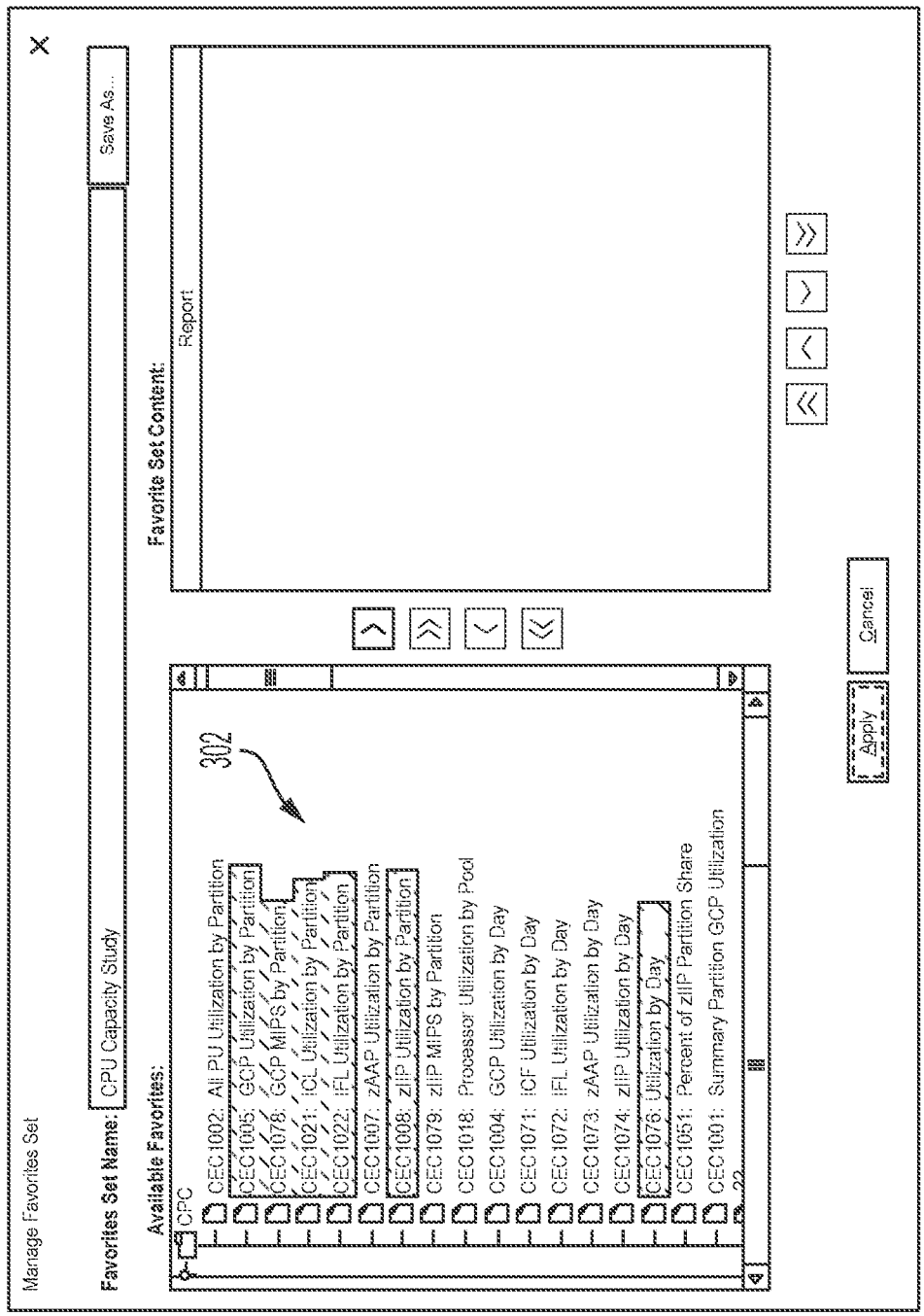

FIG. 3B illustrates graphical images selected in a group 302 through multi-selection options. The groups 302 are selected by a practitioner selecting multiple graphic images to be included in a specific study.

Figure 3C:
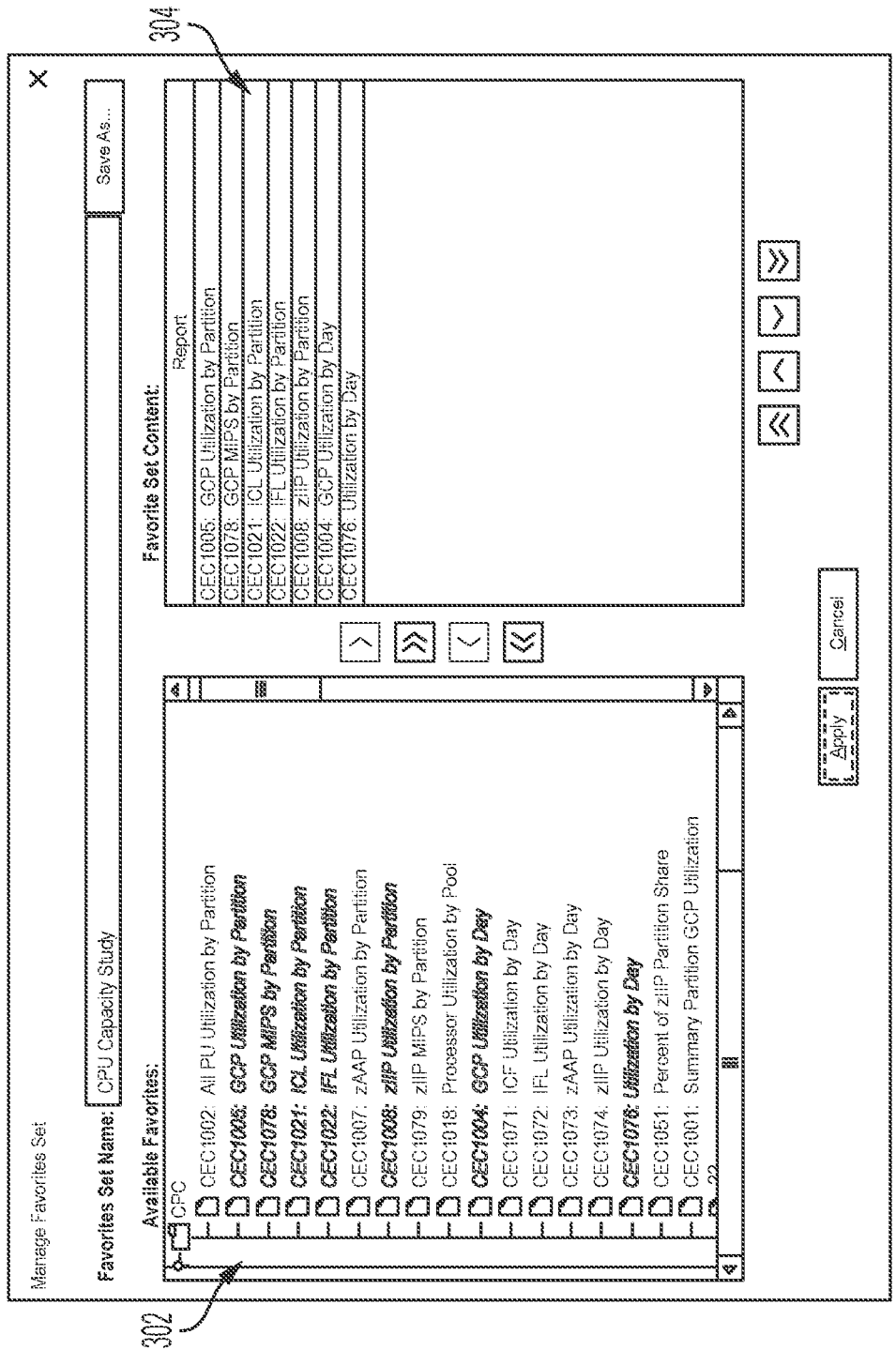

FIG. 3C illustrates the selected group 302 (of FIG. 3B) with in a favorite set content window 304. A practitioner may go to any graphical image listed within an available favorites list and select it for inclusion. Selected graphical images are presented in a new pane (i.e., favorite set content window 304) for easy identification of included graphical images.

Figure 3D:
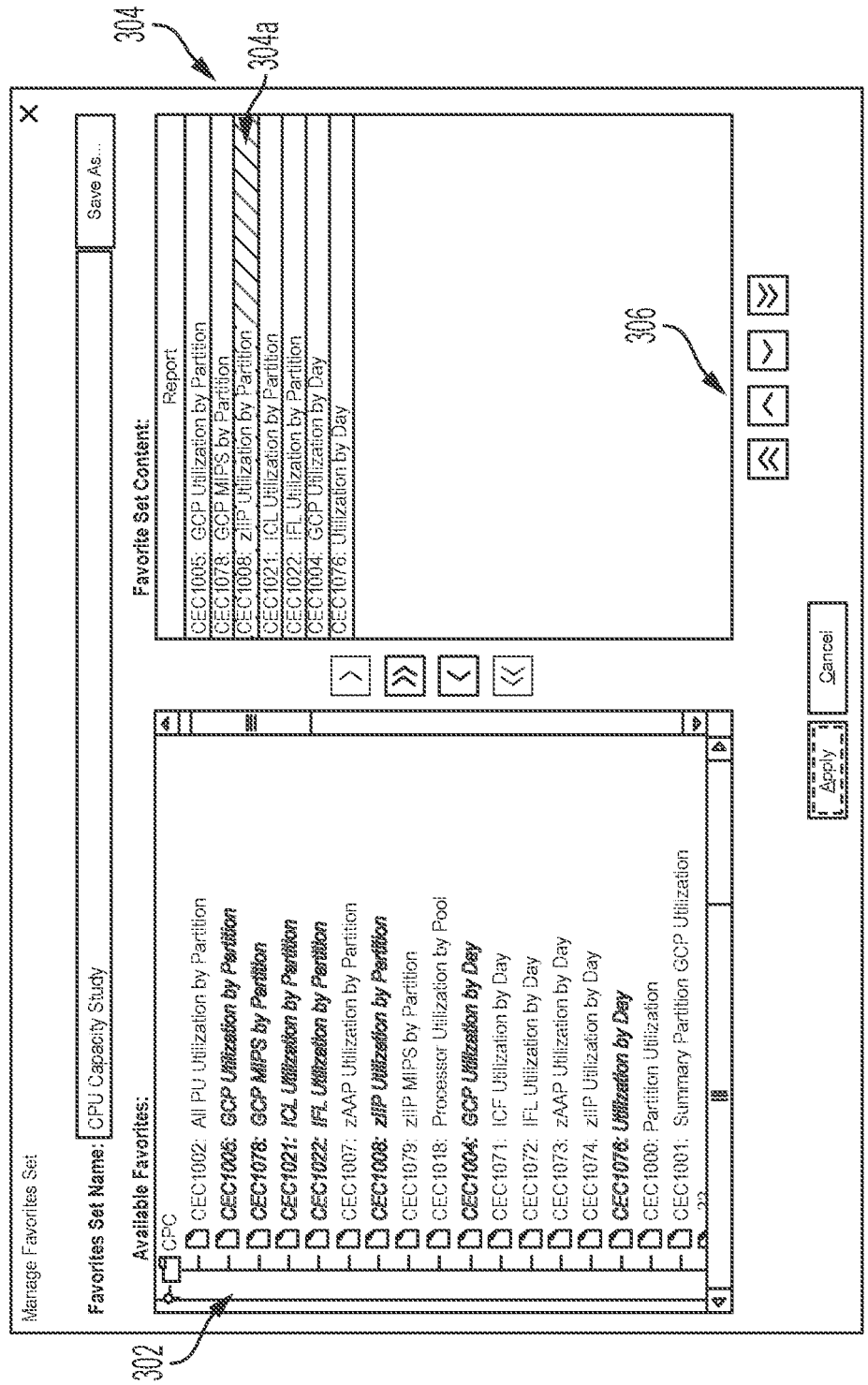

FIG. 3D illustrates a desired graphical image 304a is selected (from favorite set content window 304) for inclusion within favorite set content. An order of the desired graphical image 304a may be modified relative to all other selected content. The order may be modified by enabled selection buttons 306. A single graphical image or a group of images may be selected for placement at any position of the favorite set.

Figure 3E:
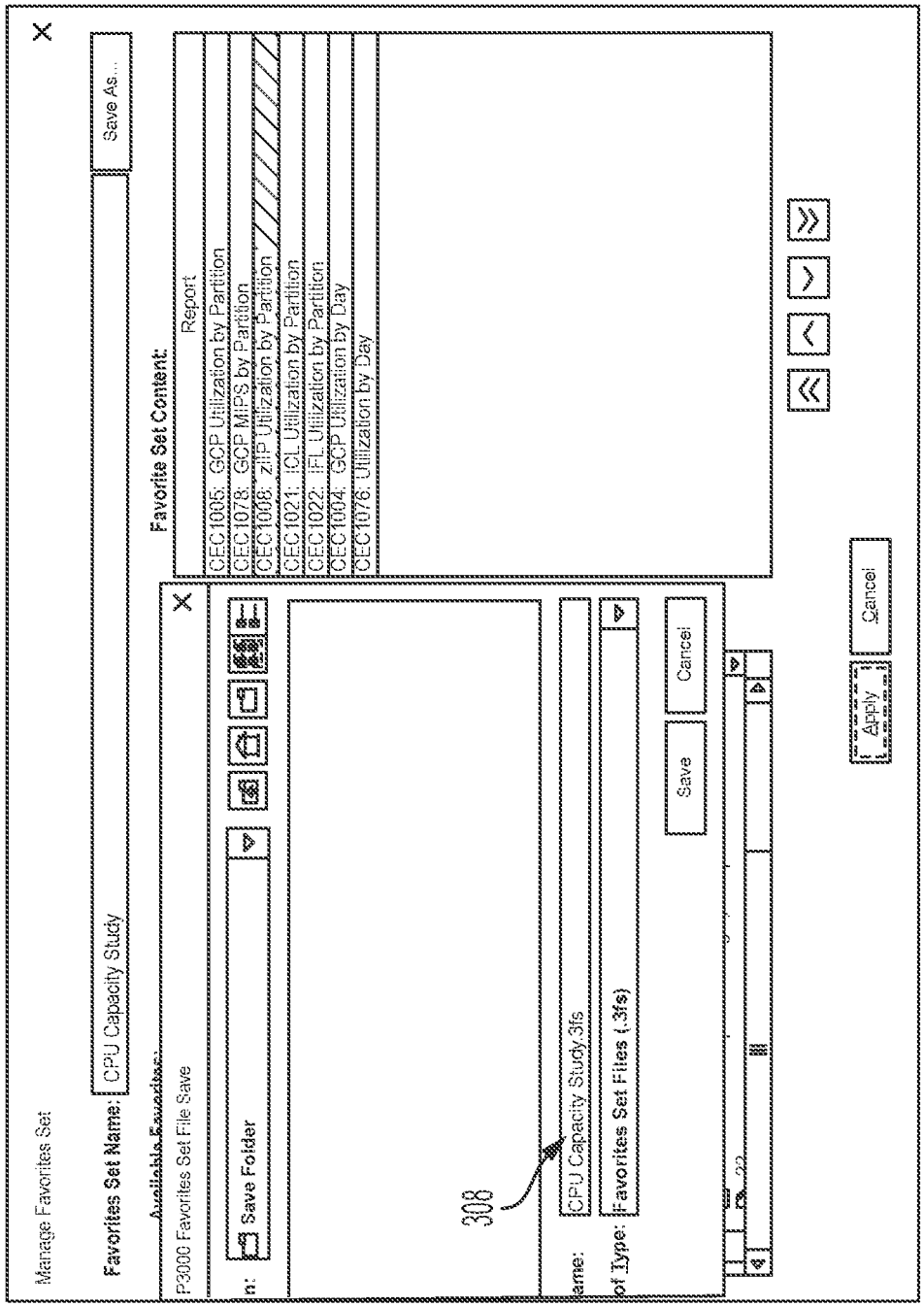

FIG. 3E illustrates a favorite set 308 being saved to an external file. When desired graphical images have been selected and ordered with respect to a practitioner command, the practitioner may save the list to an external file thereby allowing the practitioner to retain multiple lists of favorites for different study types.

Figure 3F:
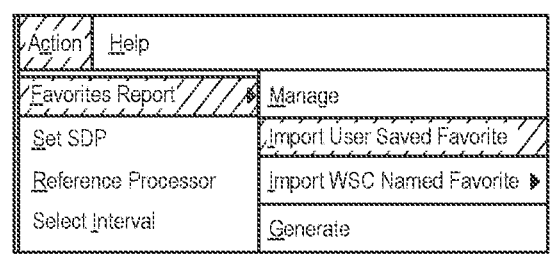

FIG. 3F illustrates a process 310 for importing a favorite set list. The practitioner may import a favorite set list from any favorite set list file. A favorite set list file may be generated by a practitioner or may be shared by another practitioner or subject matter expert.

Figure 3G:
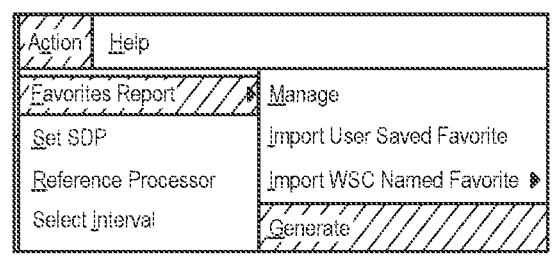

FIG. 3G illustrates a final report 312 being generated. The final report is used as a performance report by a practitioner. The final report is generated from a selected list of favorites. The following steps illustrate a process for using an output of FIG. 3G for dynamically modifying and reorganizing a performance management/capacity planning deliverable software application:

The process is initiated when a practitioner identifies a document location. The document location comprises an HTML (or any type of) file generated by system 100 of FIG. 1. Subsequently, graphical images (for the HTML file) are generated interactively or via a static scripting process. The graphical images are modified by selecting a modify document software action and an ordered list of graphical images is provided to the practitioner. The ordered list is created as a standard set. The ordered list of graphical images is published to an HTML document when the practitioner is satisfied with the content and order of the graphical images. One of the graphical images may be selected thereby causing a set of editing functions to appear. The editing functions may include a preview function configured to cause a selected graphical image to display thereby enabling the practitioner to review the graphical image. The editing functions may additionally include a group move up or down action, a single move up or down action, a delete graphical images action, etc. The practitioner may select one or multiple graphical images and transfer the one or multiple graphical images within the list of graphical images. Additionally, selected graphical images may be moved such that the practitioner may determine that a graphical image is not necessary and should be deleted from the document. Likewise, a new graphical image may be added to the document if a base set of graphic images highlights a concern or issue associated with further documentation. The newly added graphical image is visible so that the practitioner may preview the graphical image and may move the image to any location within the document thereby allowing additional or supporting graphical images to be ordered with a base graphical image indicating a need for information. The new graphical image is appended to the bottom of the list and the practitioner may move the graphical image to a preferred location within the document. Subsequently, the graphical images are saved within an HTML document and tailored documents are generated.

Figure 3H:
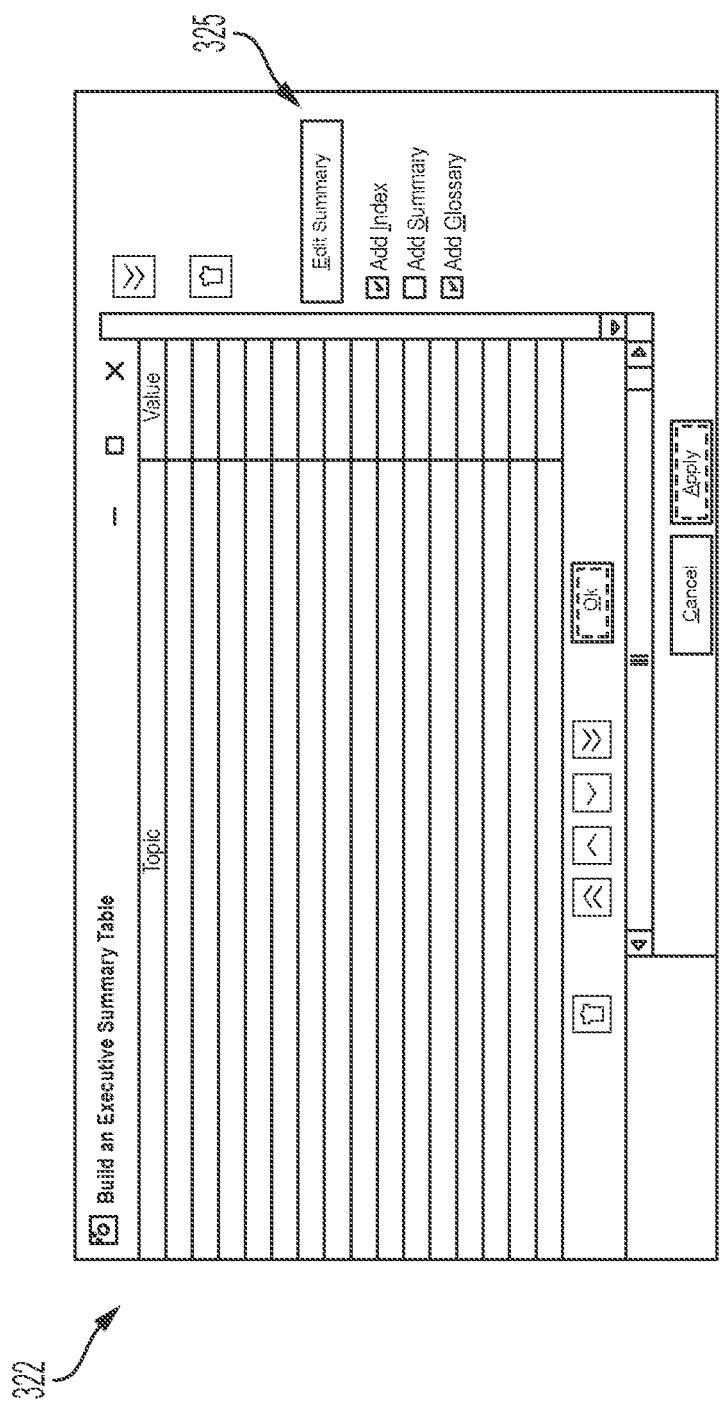

FIG. 3H illustrates an interface 322 enabling the following steps associated with a process for using an output of FIG. 3G for automatically generating and inserting an executive summary into client deliverable software. The process is initiated when a practitioner identifies a document location comprising a generated HTML file. Associated graphical images are generated interactively or via a static scripting process. When a single graphical image is generated, an executive summary may be entered and a list of graphical images is provided to the practitioner. The practitioner may initiate an edit summary action 325 to open a window for creating and modifying an executive summary. Likewise, the selected graphical image is displayed for enabling the practitioner to review the graphical image such that the practitioner may document observations, findings, conclusions, recommendations, and actions while previewing the graphical images within an executive summary window. When items are added to the executive summary, the practitioner may rank them. The practitioner is enabled to enter text in a different language. When the practitioner is satisfied with their items within the executive summary, they may enter the changes and return to a modify document window for adding the executive summary to the HTML Document.

Figure 4:
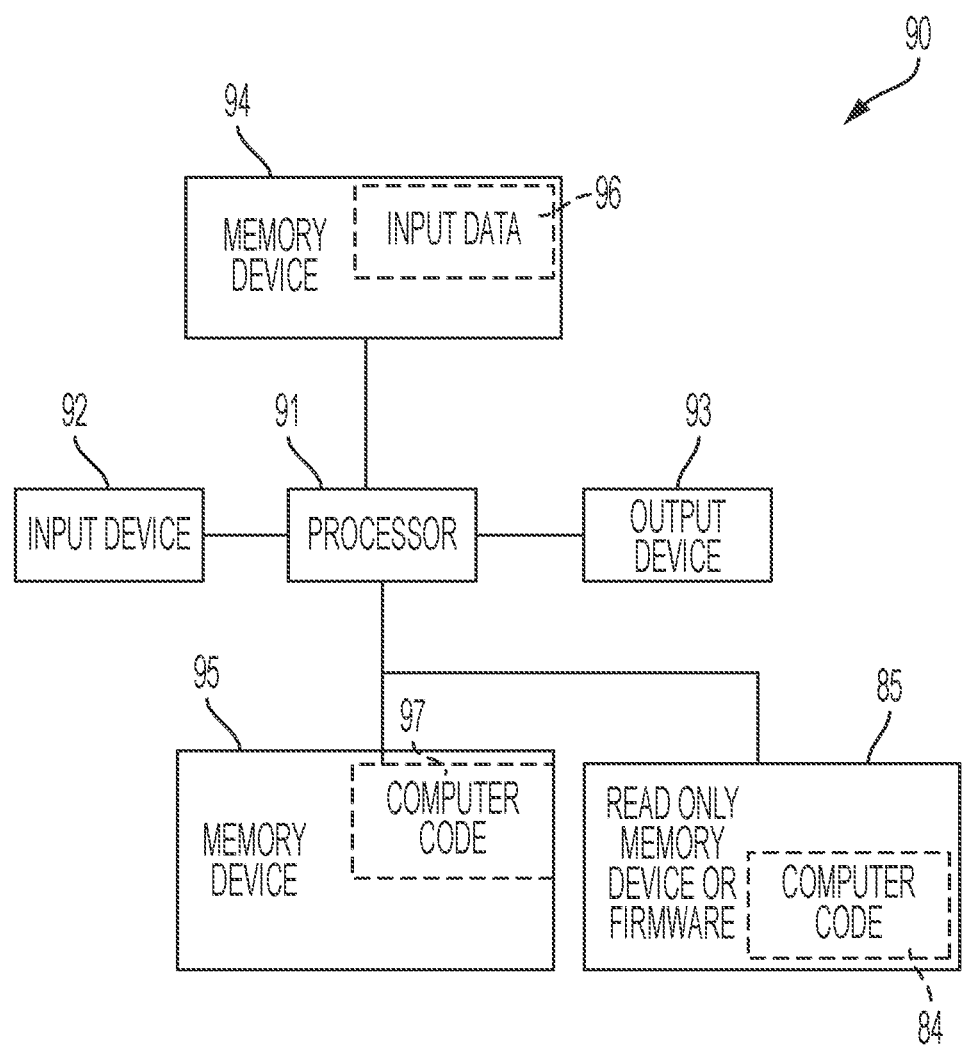
FIG. 4 illustrates a computer system used by the system of FIG. 1 for improving software technology associated with selecting graphical images, generating associated software code, and tailoring a hardware and software system for specialized functionality with respect to capturing expert knowledge and best practices, in accordance with embodiments of the present invention.

FIG. 4 illustrates a computer system 90 (e.g., hardware/software system 139 and/or electronic device 138 of FIG. 1) used by or comprised by the system of FIG. 1 for improving software technology associated with selecting graphical images, generating associated software code, and tailoring a hardware and software system for specialized functionality with respect to capturing expert knowledge and best practices, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving software technology associated with selecting graphical images, generating associated software code, and tailoring a hardware and software system for specialized functionality with respect to capturing expert knowledge and best practices. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with selecting graphical images, generating associated software code, and tailoring a hardware and software system for specialized functionality with respect to capturing expert knowledge and best practices. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with selecting graphical images, generating associated software code, and tailoring a hardware and software system for specialized functionality with respect to capturing expert knowledge and best practices. In another embodiment, the invention provides a business method that performs the process steps of the invention on a subscription, advertising, and/or fee basis. That is, a service supplier, such as a Solution Integrator, could offer to enable a process for improving software technology associated with selecting graphical images, generating associated software code, and tailoring a hardware and software system for specialized functionality with respect to capturing expert knowledge and best practices. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a configuration of hardware and software, any configuration of hardware and software, as would be known to a person of ordinary skill in the art, may be utilized for the purposes stated supra in conjunction with the computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
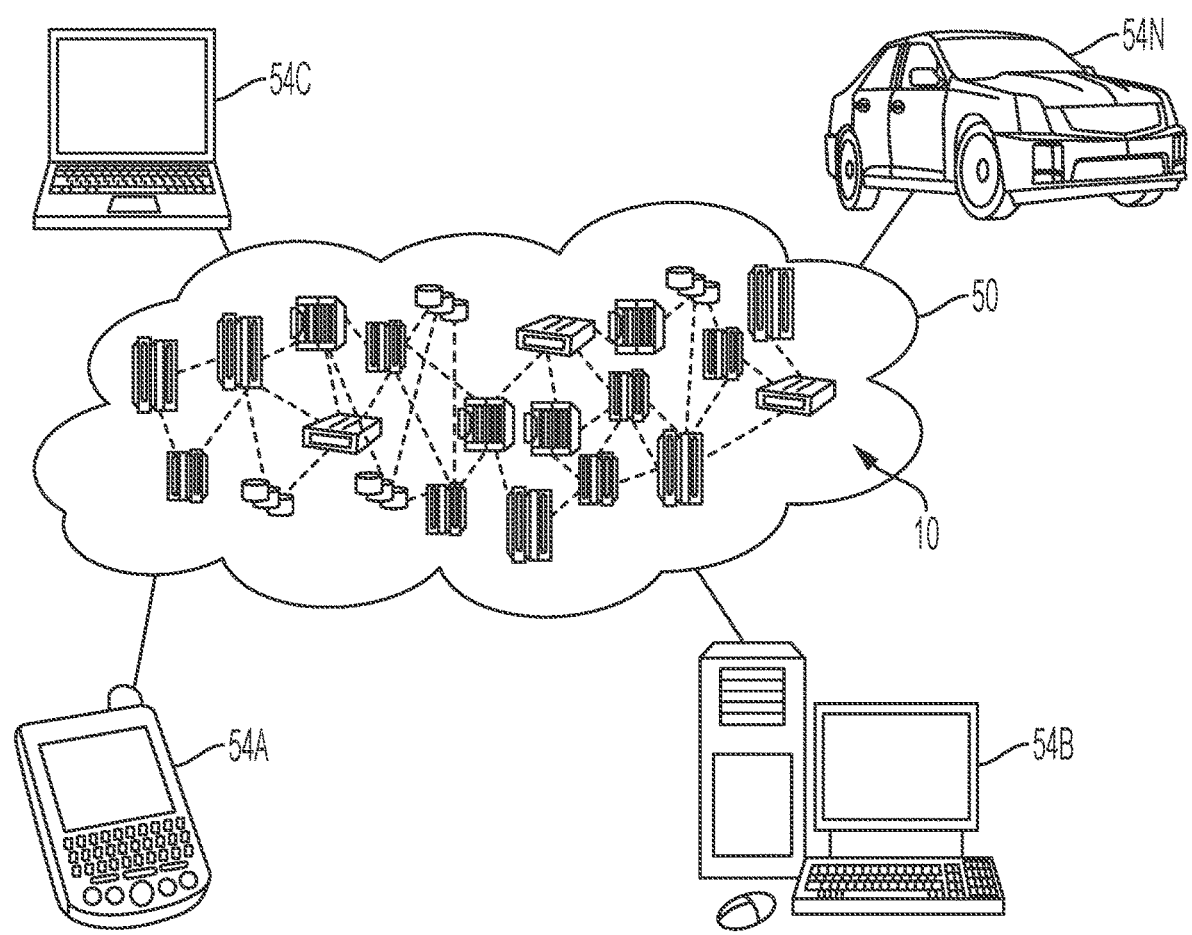
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
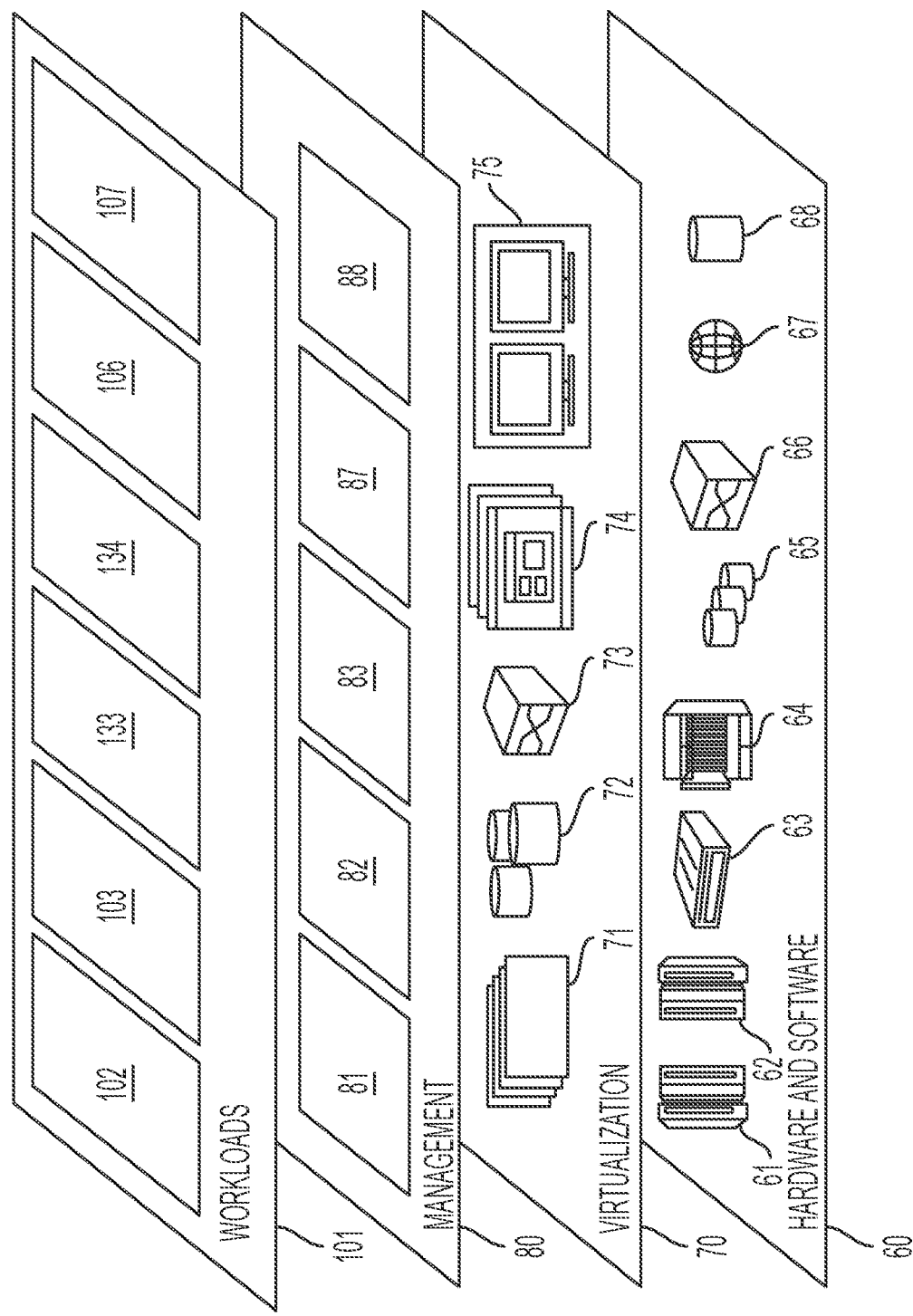
FIG. 6 illustrates a set of functional abstraction layers provided by cloud computing environment, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving software technology associated with selecting graphical images, generating associated software code, and tailoring a hardware and software system for specialized functionality with respect to capturing expert knowledge and best practices 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A software performance management and capacity planning generation and modification method comprising:
    presenting, by a processor of an electronic device via a graphical user interface (GUI), a plurality of graphical images associated with tailoring hardware and software systems for specialized functionality, wherein said specialized functionality comprises parallel sysplex review functionality, central storage usage functionality, and workload manager review functionality;
    receiving, by said processor from an authoritative user, a selection for a specified group of images of said plurality of graphical images;
    receiving, by said processor from said authoritative user, an order of said specified group of images;
    storing, by said processor within a specified portion of an external specialized memory device, said specified group of images with respect to said order;
    generating, by said processor within said GUI, a set of movement interface buttons configured to enable software controls to rearrange graphical images within said specified group of images;
    generating, by said processor within said GUI, a set of action interface buttons configured to enable software control click movements associated with control of said graphical images within said specified group of images;
    generating, by said processor, specialized software code comprising said set of movement interface buttons, said set of action interface buttons, and said specified group of images or previously stored images retrieved from said specified portion of said external specialized memory device;
    listing, by said processor, said specified group of images within a single section of a new software function generated within an internal software tool of said specialized software code;
    executing, by said processor, said specialized software code;
    monitoring, by said processor via a plurality of hardware and software sensors, functionality of said specialized software code, and
    tailoring, by said processor in response to said executing and said monitoring, a candidate hardware and software system for said specialized functionality with respect to capturing expert knowledge and best practices.

2. The method of claim 1, further comprising:
    identifying, by said processor, a software tool associated with said plurality of graphical images;
    tailoring, by said processor in response to a modification request, additional graphical images from said plurality of graphical images for modifying said specified group of images for an enhanced specialized functionality; and
    storing, by said processor within a specified portion of an external specialized memory device, said additional graphical images with respect to said order for an enhanced specialized functionality.

3. The method of claim 1, further comprising:
    identifying, by said processor, a software tool associated with said plurality of graphical images;
    tailoring, by said processor in response to a modification request, removal of graphical images for modifying said specified group of images for said enhanced specialized functionality; and
    storing, by said processor within a specified portion of an external specialized memory device, additional graphical images with respect to said order for an enhanced specialized functionality.

4. The method of claim 1, further comprising:
    identifying, by said processor, a software tool associated with said plurality of graphical images;
    tailoring, by said processor in response to a modification request, an order of a newly specified group of images for an enhanced specialized functionality; and
    storing, by said processor within a specified portion of an external specialized memory device, said newly specified group of images with respect to said order for an enhanced specialized functionality.

5. The method of claim 1, further comprising:
    receiving, by said processor within a specified portion of an external specialized memory device, a generated set of candidate graphical images;
    presenting, by said processor via a graphical user interface (GUI), said generated set of candidate graphical images;
    previewing, by said processor in response to a modification request, a specified graphical image from said generated set of candidate graphical images;
    tailoring, by said processor in response to said modification request, an order of said generated set of candidate graphical images;
    tailoring, by said processor in response to said modification request, removal of a graphical image from the generated set of candidate graphical images;
    generating, by said processor, the generated set of candidate graphical images in said order with additional document elements comprising a glossary or table of contents; and
    storing, by said processor within said specified portion of said external specialized memory device, said generated set of candidate graphical images.

6. The method of claim 5, further comprising:
identifying, by said processor, said generated set of candidate graphical images and a set of summary items;
presenting, by said processor via said GUI, said generated set of candidate graphical images;
generating, by said processor in response to a modification request, an executive digital summary describing said modification request consisting of said set of summary items;
generating, by said processor, editing functions via free form functionality associated with said modification request;
generating, by said processor, ranking functions associated with said modification request;
combining, by said processor, said specified group of graphical images with said executive digital summary; and
storing, by said processor within said specified portion of said external specialized memory device, said combined set of candidate graphical images and said set of summary items.

7. The method of claim 6, wherein said summary items are ranked via a suggested classification system or via free form classification functionality.

8. The method of claim 6, wherein said editing functions of summary items comprise of adding functions, deleting functions, and reordering functions.

9. The method of claim 1, wherein said presenting via said GUI comprises enabling said GUI via a specialized software tool.

10. The method of claim 1, further comprising:
monitoring and storing, by said processor, said specialized software code;
applying, by said processor, specified actions to said specialized software code; and
generating, by said processor, modified software code based on said specialized software code.

11. The method and system of claim 10, wherein said specialized software code is provided by an authoritative user via said GUI for application to additional data sets for generating an associated file.

12. The method of claim 1, further comprising:
generating, by said processor, machine learning software code for executing future processes associated with executing said software performance management and capacity planning generation and modification method; and
storing, by said processor, said machine learning software code within a modified portion of a memory structure of said electronic device.

13. The method of claim 1, further comprising:
providing at least one support service for at least one of creating, integrating, hosting, maintaining, and deploying computer-readable code in the electronic device, said code being executed by the computer processor to implement: said presenting, said receiving said selection, said receiving said order, said storing, said generating, said executing, and said tailoring.

14. A computer program product, comprising a computer readable hardware storage device storing a computer readable program code, said computer readable program code comprising an algorithm that when executed by a processor of an electronic device implements a software performance management and capacity planning generation and modification method, said method comprising:
presenting, by said processor via a graphical user interface (GUI), a plurality of graphical images associated with tailoring hardware and software systems for specialized functionality, wherein said specialized functionality comprises parallel sysplex review functionality, central storage usage functionality, and workload manager review functionality;
receiving, by said processor from an authoritative user, a selection for a specified group of images of said plurality of graphical images;
receiving, by said processor from said authoritative user, an order of said specified group of images;
storing, by said processor within a specified portion of an external specialized memory device, said specified group of images with respect to said order;
generating, by said processor within said GUI, a set of movement interface buttons configured to enable software controls to rearrange graphical images within said specified group of images;
generating, by said processor within said GUI, a set of action interface buttons configured to enable software control click movements associated with control of said graphical images within said specified group of images;
generating, by said processor, specialized software code comprising said set of movement interface buttons, said set of action interface buttons, and said specified group of images or previously stored images retrieved from said specified portion of said external specialized memory device;
listing, by said processor, said specified group of images within a single section of a new software function generated within an internal software tool of said specialized software code;
executing, by said processor, said specialized software code;
monitoring, by said processor via a plurality of hardware and software sensors, functionality of said specialized software code, and
tailoring, by said processor in response to said executing and said monitoring, a candidate hardware and software system for said specialized functionality with respect to capturing expert knowledge and best practices.

15. The computer program product of claim 14, wherein said method further comprises:
identifying, by said processor, a software tool associated with said plurality of graphical images;
tailoring, by said processor in response to a modification request, additional graphical images from said plurality of graphical images for modifying said specified group of images for an enhanced specialized functionality; and
storing, by said processor within a specified portion of an external specialized memory device, said additional graphical images with respect to said order for an enhanced specialized functionality.

16. The computer program product of claim 14, wherein said method further comprises:
identifying, by said processor, a software tool associated with said plurality of graphical images;
tailoring, by said processor in response to a modification request, removal of graphical images for modifying said specified group of images for said enhanced specialized functionality; and
storing, by said processor within a specified portion of an external specialized memory device, additional graphical images with respect to said order for an enhanced specialized functionality.

17. The computer program product of claim 14, wherein said method further comprises:
- identifying, by said processor, a software tool associated with said plurality of graphical images;
- tailoring, by said processor in response to a modification request, an order of a newly specified group of images for an enhanced specialized functionality; and
- storing, by said processor within a specified portion of an external specialized memory device, said newly specified group of images with respect to said order for an enhanced specialized functionality.

18. The computer program product of claim 14, wherein said method further comprises:
- receiving, by said processor within a specified portion of an external specialized memory device, a generated set of candidate graphical images;
- presenting, by said processor via a graphical user interface (GUI), said generated set of candidate graphical images;
- previewing, by said processor in response to a modification request, a specified graphical image from said generated set of candidate graphical images;
- tailoring, by said processor in response to said modification request, an order of said generated set of candidate graphical images;
- tailoring, by said processor in response to said modification request, removal of a graphical image from the generated set of candidate graphical images;
- generating, by said processor, the generated set of candidate graphical images in said order with additional document elements comprising a glossary or table of contents; and
- storing, by said processor within said specified portion of said external specialized memory device, said generated set of candidate graphical images.

19. The computer program product of claim 18, wherein said method further comprises:
- identifying, by said processor, said generated set of candidate graphical images and a set of summary items;
- presenting, by said processor via said GUI, said generated set of candidate graphical images;
- generating, by said processor in response to a modification request, an executive digital summary describing said modification request consisting of said set of summary items;
- generating, by said processor, editing functions via free form functionality associated with said modification request;
- generating, by said processor, ranking functions associated with said modification request;
- combining, by said processor, said specified group of graphical images with said executive digital summary; and
- storing, by said processor within said specified portion of said external specialized memory device, said combined set of candidate graphical images and said set of summary items.

20. An electronic device comprising a processor coupled to a computer-readable memory unit, said memory unit comprising instructions that when executed by the processor implements a software performance management and capacity planning generation and modification method comprising:
- presenting, by said processor via a graphical user interface (GUI), a plurality of graphical images associated with tailoring hardware and software systems for specialized functionality, wherein said specialized functionality comprises parallel sysplex review functionality, central storage usage functionality, and workload manager review functionality;
- receiving, by said processor from an authoritative user, a selection for a specified group of images of said plurality of graphical images;
- receiving, by said processor from said authoritative user, an order of said specified group of images;
- storing, by said processor within a specified portion of an external specialized memory device, said specified group of images with respect to said order;
- generating, by said processor within said GUI, a set of movement interface buttons configured to enable software controls to rearrange graphical images within said specified group of images;
- generating, by said processor within said GUI, a set of action interface buttons configured to enable software control click movements associated with control of said graphical images within said specified group of images;
- generating, by said processor, specialized software code comprising said set of movement interface buttons, said set of action interface buttons, and said specified group of images or previously stored images retrieved from said specified portion of said external specialized memory device;
- listing, by said processor, said specified group of images within a single section of a new software function generated within an internal software tool of said specialized software code;
- executing, by said processor, said specialized software code;
- monitoring, by said processor via a plurality of hardware and software sensors, functionality of said specialized software code, and
- tailoring, by said processor in response to said executing and said monitoring, a candidate hardware and software system for said specialized functionality with respect to capturing expert knowledge and best practices.

* * * * *